US012592333B2

(12) United States Patent
Chen et al.

(10) Patent No.: US 12,592,333 B2
(45) Date of Patent: Mar. 31, 2026

(54) VOICE COIL AND VOICE COIL MOLDING ASSEMBLY

(71) Applicant: AAC Microtech (Changzhou) Co., Ltd., Changzhou (CN)

(72) Inventors: Zhichen Chen, Changzhou (CN); Liang Chen, Changzhou (CN); Yuemei Gu, Changzhou (CN); Xuelei Cai, Changzhou (CN); Qicong Zhu, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 232 days.

(21) Appl. No.: 18/520,579

(22) Filed: Nov. 28, 2023

(65) Prior Publication Data

US 2025/0095898 A1 Mar. 20, 2025

Related U.S. Application Data

(63) Continuation of application No. PCT/CN2023/119901, filed on Sep. 20, 2023.

(51) Int. Cl.
*H04R 1/06* (2006.01)
*H01F 7/20* (2006.01)
*H04R 9/04* (2006.01)
*H04R 9/06* (2006.01)

(52) U.S. Cl.
CPC ................ *H01F 7/20* (2013.01); *H04R 1/06* (2013.01); *H04R 9/046* (2013.01); *H04R 9/06* (2013.01); *H04R 2499/11* (2013.01)

(58) Field of Classification Search
CPC .......... H04R 1/06; H04R 9/025; H04R 9/046; H04R 9/06; H04R 2499/11; H01F 7/20
See application file for complete search history.

(56) References Cited

U.S. PATENT DOCUMENTS

2016/0366520 A1* 12/2016 Shen ...................... H04R 9/025
2017/0339478 A1* 11/2017 Xiao ...................... H04R 9/025

FOREIGN PATENT DOCUMENTS

CN 205726381 U * 11/2016

* cited by examiner

*Primary Examiner* — Huyen D Le
(74) *Attorney, Agent, or Firm* — Wiersch Law Group

(57) ABSTRACT

The present application provides a voice coil and a voice coil molding assembly, and the voice coil includes a voice coil body wound by a voice coil winding wire, and an inlet section and an outlet section extending from the voice coil body. The voice coil body includes two first straight edges arranged oppositely, two second straight edges arranged oppositely, and four arcuate portions configured to connect the two first straight edges and the two second straight edges. The inlet section and the outlet section are respectively arranged at the middle position of any one of the arcuate sections, and the inlet section and the outlet section are extended out from below and above the voice coil body, respectively. Compared with the related art, the voice coil can effectively avoid the occurrence of voice coil opening and wire dropping, and greatly improve product performance and reliability.

5 Claims, 5 Drawing Sheets

A-A

VOICE COIL AND VOICE COIL MOLDING ASSEMBLY

CROSS-REFERENCE TO RELATED APPLICATIONS

This application is a continuation of International Application No. PCT/CN2023/119901, filed Sep. 20, 2023, the entire contents of which are incorporated herein by reference.

TECHNICAL FIELD

The present application relates to the technical field of electroacoustic conversion, in particular to a voice coil and a voice coil molding assembly.

BACKGROUND

With the advent of the Internet era, the number of mobile terminal devices is rising. Among the mobile devices, cell phones are undoubtedly the most common and portable mobile devices. The speaker device used to play music and other sounds is used in a large number of mobile devices such as cell phones, and the voice coil in the sound device is particularly important.

In the voice coil structure of the related art, the inlet and outlet wires are generally placed on a straight edge of the voice coil to save arrangement space in the past manufacturing process of the voice coil. However, when the inlet and outlet wires are located on the straight edge of the voice coil, due to the lack of adequate support and protection, the bonding strength of the inlet and outlet wires is relatively weak, which is easy to occur phenomena such as openings and drop wires, and in turn affects the product's pure sound, performance, and reliability.

Therefore, it is necessary to provide a new voice coil to solve the above-mentioned technical problem.

SUMMARY

An object of the present application is to provide a voice coil that can increase the bonding strength of the inlet and outlet wires, effectively avoid the occurrence voice coil opening and wire dropping, and greatly improve product performance and reliability.

In order to achieve the above object, in the first aspect, the present application provides a voice coil, the voice coil comprising:

- a voice coil body in the form of a rectangular ring structure and wound by a voice coil winding wire; and
- an inlet section and an outlet section extending from the voice coil body;
- wherein the voice coil body comprises two first straight edges arranged oppositely, two second straight edges arranged oppositely, and four arcuate portions connecting two of the first straight edges and two of the second straight edges; the inlet section and the outlet section are arranged in a middle position of any one of the arcuate portions, and the inlet section and the outlet section are extended out from a lower position and an upper position of the voice coil body, respectively.

In one embodiment, the inlet section and the outlet section are provided below and above the middle position of the two adjacent arcuate sections, respectively.

In one embodiment, a length of the first straight edge is greater than a length of the second straight edge.

In one embodiment, the inlet section and the outlet section are arranged below and above the middle position of the arcuate portions at both ends of the second straight edge, respectively.

In one embodiment, each of the arcuate portions is a circular structure in shape.

In the second aspect, embodiments of the present application further provide a voice coil molding assembly, configured to mold the above-mentioned voice coil, and comprising a discharge plate;

- wherein the discharge plate comprises a discharge plate body, a through-hole arranged through the discharge plate body and in the shape of an annulus, a first arcuate groove and a second arcuate groove formed by the recess of the discharge plate body and spaced apart from each other, and a first recess and a second recess formed by the recess of the discharge plate body; the first recess is located on a side of the first arcuate groove away from the through-hole, and the second recess is located on a side of the second arcuate groove away from the through-hole; the through-hole is configured to accommodate the voice coil body;
- a connecting portion between the first arcuate groove and the first recess is arranged through to form an avoidance hole, or a connecting portion between the second arcuate groove and the second recess is arranged through to form an avoidance hole;
- the first recess is configured to place the inlet section of the voice coil, and the avoidance hole is configured to place the outlet section of the voice coil.

In one embodiment, the first recess and the second recess have the same structure, and the first arcuate groove and the second arcuate groove have the same structure.

In one embodiment, a depth of the first recess is greater than a depth of the first arcuate groove.

In one embodiment, the voice coil molding assembly further comprises a third arcuate groove and a fourth arcuate groove formed by the recess of the discharge plate body and spaced apart from each other, wherein a side of the third arcuate groove away from the first recess is located in the same straight line as the first arcuate groove, and a side of the fourth arcuate groove away from the second recess is located in the same straight line as the second arcuate groove.

In one embodiment, the first arcuate groove, the second arcuate groove, the third arcuate groove, and the fourth arcuate groove have the same structure.

Compared with the related art, in the voice coil and the voice coil molding assembly of the present application, the voice coil body is provided with the inlet section and the outlet section, and the inlet section and the outlet section are arranged below and above the middle position of the arcuate portions, respectively. The opening for the inlet and outlet wires is designed to a middle position of the arcuate section, so that the bonding strength of the inlet and outlet wires can be increased, and the occurrences of voice coil opening and dropping are effectively avoided, thereby greatly improving product performance and reliability, and satisfying customer needs. Besides, through the design of the avoidance holes on the discharge plate of the voice coil molding assembly, the R-corner of the voice coil is avoided from direct contact with the discharge plate, which effectively prevents the R-corner of the voice coil from being crushed, and improves the reliability.

BRIEF DESCRIPTION OF THE DRAWINGS

In order to illustrate the technical solutions in the embodiments of the present application more clearly, the accompanying drawings to be used in the description of the embodiments will be briefly introduced below. Obviously, the accompanying drawings in the following description are only some embodiments of the present application, and for those of ordinary skill in the field, other accompanying drawings may be obtained based on these drawings without creative labor.

DETAILED DESCRIPTION OF THE EMBODIMENTS

The technical solutions in the embodiments of the present application will be described clearly and completely in the following in conjunction with the accompanying drawings in the embodiments of the present application. Obviously, the described embodiments are only a part of the embodiments of the present application and not all of the embodiments. Based on the embodiments in the present application, all other embodiments obtained by those of ordinary skill in the art without making creative labor are within the protection scope of the present application.

Embodiment 1

Figure 1:
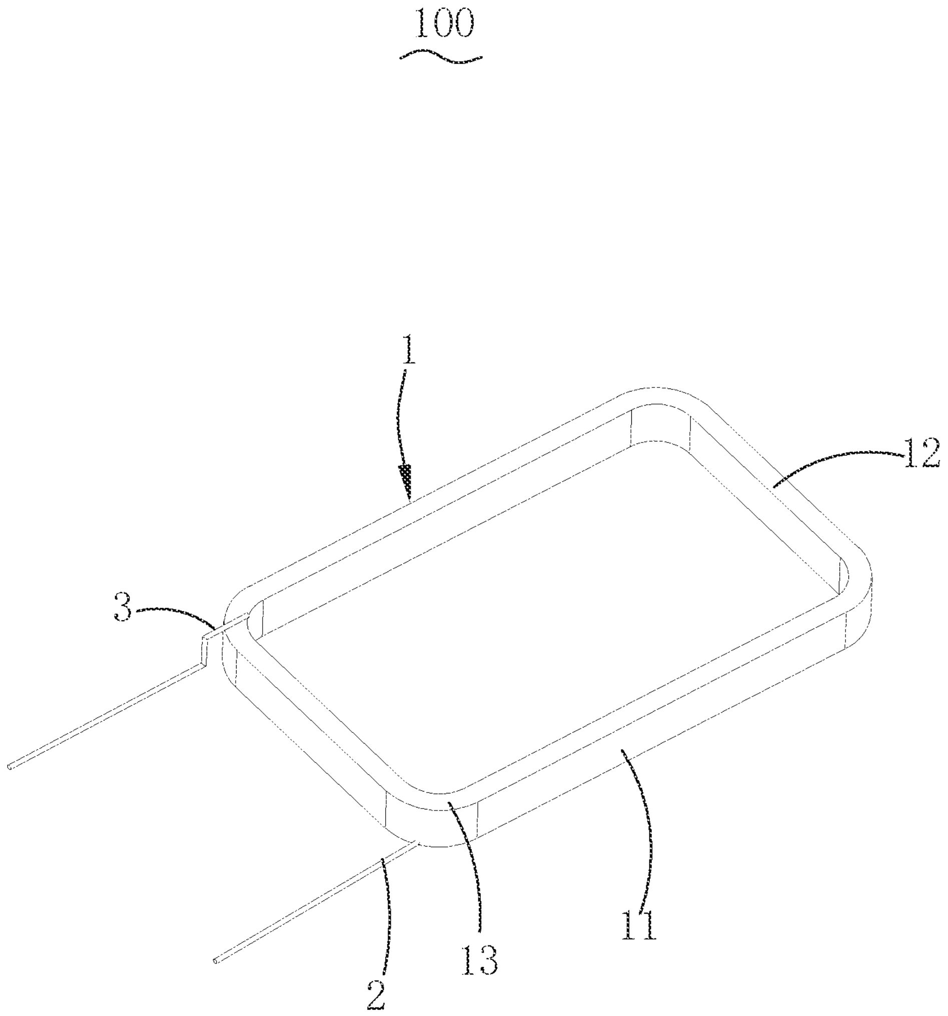
FIG. 1 shows a structural diagram of a voice coil according to an embodiment of the present application.
Figure 2:
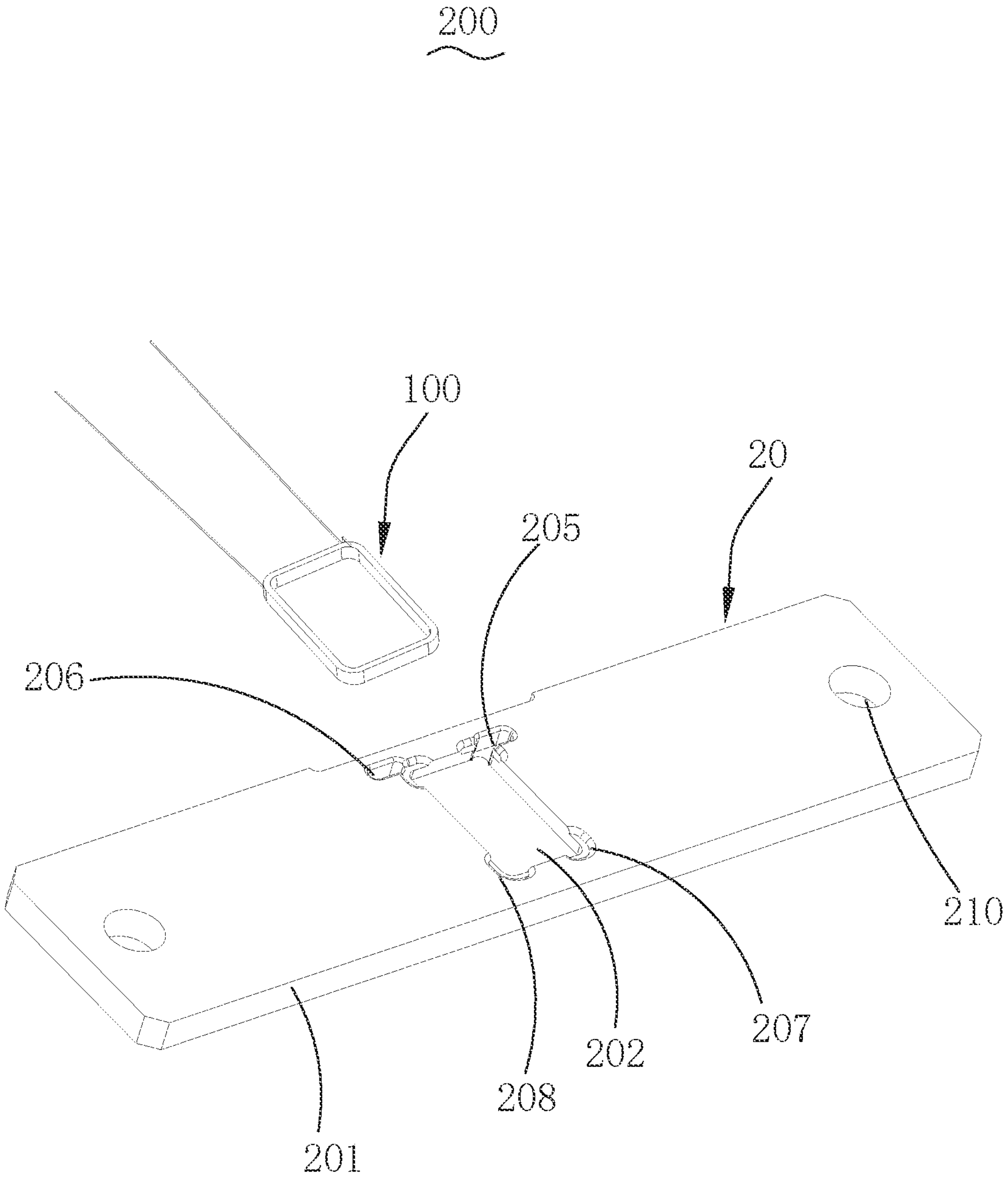
FIG. 2 shows a structural diagram of a voice coil molding assembly according to an embodiment of the present application.
Figure 3:
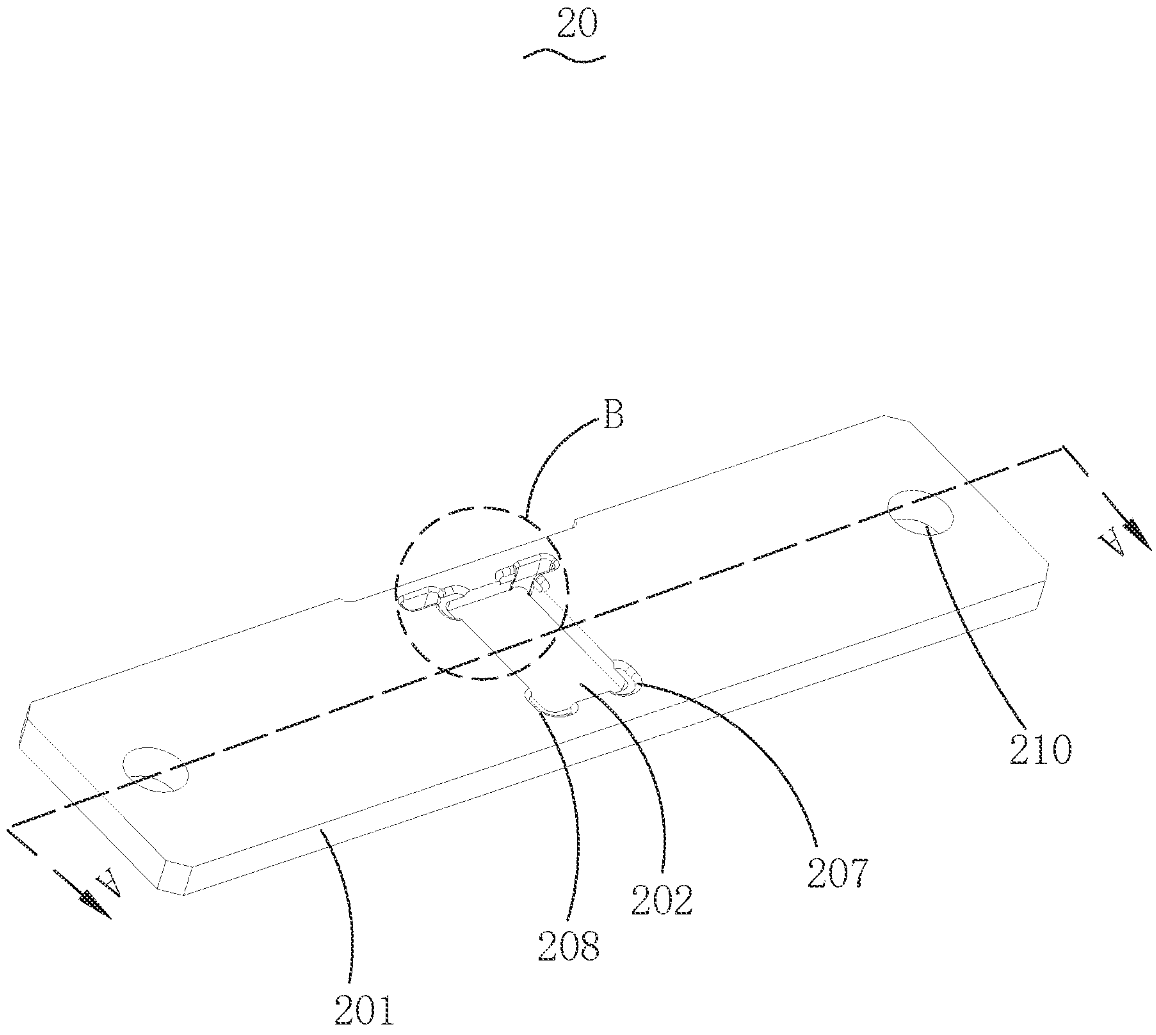
FIG. 3 shows a structural diagram of a discharge plate according to an embodiment of the present application.
Figure 4:
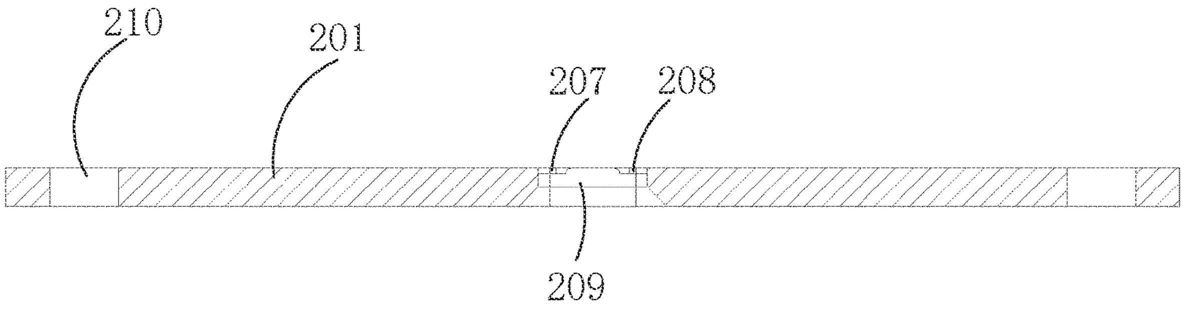
FIG. 4 shows a sectional view along the direction of line A-A in FIG. 3.
Figure 5:
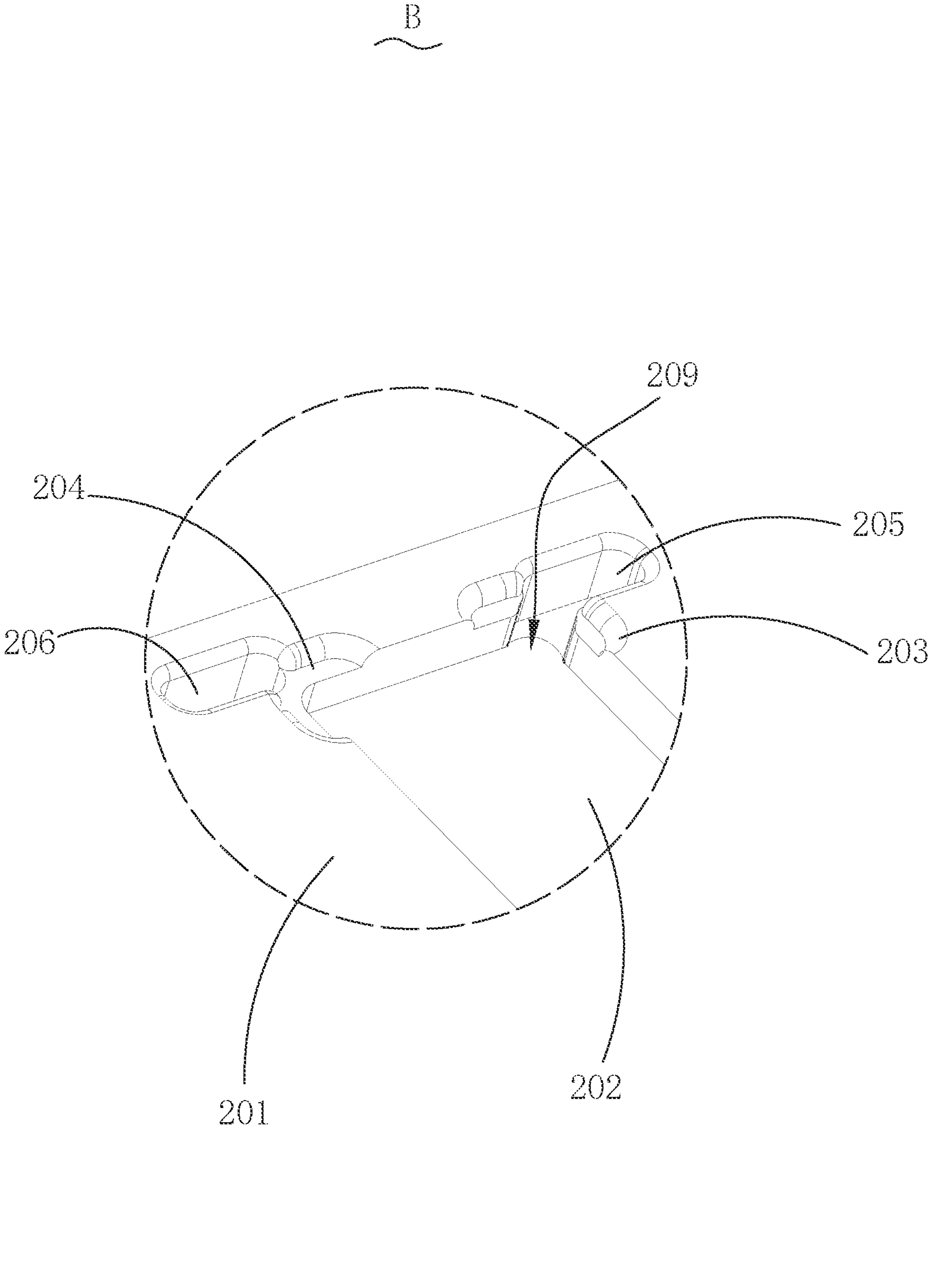
FIG. 5 shows a partially enlarged view of B in FIG. 3.

As shown in FIG. 1, embodiments of the present application provide a voice coil 100, including a voice coil body 1 in the form of a rectangular ring structure and wound by a voice coil winding wire to form a rectangular ring structure, and an inlet section 2 and an outlet section 3 extending from the voice coil body 1. The voice coil body 1 is configured to support the inlet section 2 and the outlet section 3, and to facilitate the arrangement of the inlet section 2 and the outlet section 3.

The voice coil body 1 includes two first straight edges 11 arranged oppositely, two second straight edges 12 arranged oppositely, and four arcuate portions 13 connecting the two first straight edges 11 and the two second straight edges 12. The inlet section and the outlet section are arranged in a middle position of any one of the arcuate portions 13, and the inlet section 2 and the outlet section 3 are extended out of a bottom and a top of the voice coil body 1, respectively. By designing the opening for the inlet and outlet wires to the middle position of the arcuate portions 13, the bonding strength of the inlet and outlet wires can be increased, and the occurrences of voice coil 100 opening and wire dropping are effectively avoided, thereby greatly improving product performance and reliability In this embodiment, the inlet section 2 and the outlet section 3 are arranged below and above the middle positions of the adjacent arcuate sections 13, respectively. It facilitates the arrangement of the inlet and outlet wires on the inlet section 2 and the outlet section 3, respectively, thereby reducing the length of the winding wire, improving the strength of the inlet and outlet wires, and enhancing the service life.

In this embodiment, the length of the first straight edge 11 is greater than the length of the second straight edge 12.

In this embodiment, the inlet section 2 and the outlet section 3 are arranged below and above the middle position of the arcuate portions 13 at each end of the second straight edge 12, respectively.

In this embodiment, the arcuate sections 13 are in a circular structure.

Embodiment 2

Combined with FIGS. 1 to 5, embodiments of the present application provide a voice coil molding assembly 200, which is used for molding the voice coil 100 in Embodiment 1. The voice coil molding assembly 200 includes a discharge plate 20.

The discharge plate 20 includes a discharge plate body 201, a through-hole 202 arranged through the discharge plate body 201 and in the shape of an annulus, a first arcuate groove 203, and a second arcuate groove 204 formed by the recess of the discharge plate body 201 and spaced apart from each other, and a first recess 205 and a second recess 206 formed by the recess of the discharge plate body 201. The first recess 205 is located in a side of the first arcuate groove 206 away from the through-hole 202, and the second recess 206 is located on a side of the second arcuate groove 204 away from the through-hole 202. The through-hole 202 is configured to accommodate the voice coil body 1.

A connecting portion between the first arcuate groove 203 and the first recess 205 or a connecting portion between the second arcuate groove 204 and the second recess 206 is arranged throughout to form an avoidance hole 209. The first recess 205 is configured to accommodate the inlet section 2 of the voice coil 100, and the avoidance hole 209 is configured to accommodate the outlet wire section 3 of the voice coil 100.

The inlet section 2 of the voice coil 100 is located in the first recess 205 and the outlet section 3 of the voice coil 100 is located in the avoidance hole 209. By the design of the avoidance holes 209 in the discharge plate 20, the R-corner of the voice coil 100 avoids direct contact with the discharge plate 20, which effectively prevents the R-corner of the voice coil 100 from being pressed, and improves reliability.

In this embodiment, the first recess 205 and the second recess 206 have the same structure, and the first arcuate groove 203 and the second arcuate groove 204 have the same structure.

In this embodiment, the depth of the first recess 205 is greater than the depth of the first arcuate groove 203. Since the inlet section 2 and the outlet section 3 are provided below and above the middle position of the arcuate portions 13, respectively, which facilitates avoidance between of the inlet section 2 and the outlet section 3, thereby preventing the arcuate portions 13 of the voice coil 100 from directly contacting and crushing the discharge plate 20, which is highly reliable.

In this embodiment, the voice coil molding assembly 200 further includes a third arcuate groove 207 and a fourth arcuate groove 208 formed by the recess of the discharge plate body 201 and spaced apart from each other. A side of the third arcuate groove 207 away from the first recess 205 is located in the same straight line as the first arcuate groove 203. A side of the fourth arcuate groove 208 away from the side of the second recess 206 is located in the same straight line as the second arcuate groove 204.

In this embodiment, the first arcuate groove 203, the third arcuate groove 207, and the fourth arcuate groove 208 have the same structure.

In this embodiment, two fixing holes 210 are also spaced apart and arranged through the discharge plate body 201, and the two fixing holes 210 are located on both sides of the through-hole 202. The fixing holes 210 are configured to fix the discharge plate 20 to improve the stability of production.

Compared with the related art, in the voice coil and the voice coil molding assembly of the present application, the voice coil body is provided with the inlet section and the outlet section, and the inlet section and the outlet section are arranged below and above the middle position of the arcuate portions, respectively. The opening for the inlet and outlet wires is designed to a middle position of the arcuate section, so that the bonding strength of the inlet and outlet wires can be increased, and the occurrences of voice coil opening and dropping are effectively avoided, thereby greatly improving product performance and reliability, and satisfying customer needs. Besides, through the design of the avoidance holes on the discharge plate of the voice coil molding assembly, the R-corner of the voice coil is avoided from direct contact with the discharge plate, which effectively prevents the R-corner of the voice coil from being crushed, and improves the reliability.

Described above are only some embodiments of the present application, and it should be noted herein that improvements may be made by those of ordinary skill in the art without departing from the inventive conception of the present application, but all of these fall within the protection scope of the present application.

What is claimed is:

1. A voice coil molding assembly, configured to mold a voice coil, the voice coil comprising:

a voice coil body in the form of a rectangular ring structure and wound by a voice coil winding wire to form a rectangular ring structure; and an inlet section and an outlet section extending from the voice coil body;

wherein the voice coil body comprises two first straight edges arranged oppositely, two second straight edges arranged oppositely, and four arcuate portions connecting two of the first straight edges and two of the second straight edges; the inlet section and the outlet section are arranged in a middle position of any one of the arcuate portions, and the inlet section and the outlet section are extended out from a lower position and an upper position of the voice coil body, respectively;

and the voice molding assembly comprising a discharge plate;

wherein the discharge plate comprises a discharge plate body, a through-hole arranged through the discharge plate body and in the shape of an annulus, a first arcuate groove and a second arcuate groove formed by the recess of the discharge plate body and spaced apart from each other, and a first recess and a second recess formed by the recess of the discharge plate body; the first recess is located on a side of the first arcuate groove away from the through-hole, and the second recess is located on a side of the second arcuate groove away from the through-hole; the through-hole is configured to accommodate the voice coil body;

a connecting portion between the first arcuate groove and the first recess is arranged through to form an avoidance hole, or a connecting portion between the second arcuate groove and the second recess is arranged through to form an avoidance hole;

the first recess is configured to place the inlet section of the voice coil and the avoidance hole is configured to place the outlet section of the voice coil.

2. The voice coil molding assembly of claim 1, wherein the first recess and the second recess have the same structure, and the first arcuate groove and the second arcuate groove have the same structure.

3. The voice coil molding assembly of claim 2, wherein a depth of the first recess is greater than a depth of the first arcuate groove.

4. The voice coil molding assembly of claim 1, further comprising a third arcuate groove and a fourth arcuate groove formed by the recess of the discharge plate body and spaced apart from each other, wherein a side of the third arcuate groove away from the first recess is located in the same straight line as the first arcuate groove, and a side of the fourth arcuate groove away from the second recess is located in the same straight line as the second arcuate groove.

5. The voice coil molding assembly of claim 4, wherein the first arcuate groove, the second arcuate groove, the third arcuate groove, and the fourth arcuate groove have the same structure.

* * * * *